(12) United States Patent
Zhang

(10) Patent No.: US 9,854,174 B2
(45) Date of Patent: Dec. 26, 2017

(54) SHOT IMAGE PROCESSING METHOD AND APPARATUS

(71) Applicant: DONGGUAN GOLDEX COMMUNICATION TECHNOLOGY CO., LTD., Dongguan (CN)

(72) Inventor: Jianbin Zhang, Dongguan (CN)

(73) Assignee: DONGGUAN GOLDEX COMMUNICATION TECHNOLOGY CO., LTD., Dongguan, Guangdong ( * ) Notice: Subject to any disclaimer, the term of this patent is extended or adjusted under 35 U.S.C. 154(b) by 0 days.

(21) Appl. No.: 15/050,149

(22) Filed: Feb. 22, 2016

(65) Prior Publication Data

US 2016/0173786 A1 Jun. 16, 2016

Related U.S. Application Data

(63) Continuation of application No. PCT/CN2014/070726, filed on Jan. 16, 2014.

(30) Foreign Application Priority Data

Aug. 22, 2013 (CN) .......................... 2013 1 0370097

(51) Int. Cl.
*H04N 5/232* (2006.01)
*G06T 1/00* (2006.01)

(52) U.S. Cl.
CPC .......... *H04N 5/23296* (2013.01); *G06T 1/00* (2013.01); *H04N 5/23222* (2013.01); *H04N 5/23293* (2013.01)

(58) Field of Classification Search
CPC .... G02B 27/58; G02B 27/646; H04N 5/2257; H04N 5/23238; H04N 5/23245;
(Continued)

(56) References Cited

U.S. PATENT DOCUMENTS

| 8,144,235 B2* | 3/2012 | Mori | G06K 9/00228 |
| | | | 348/345 |
| 9,064,348 B2* | 6/2015 | Ahn | G06T 11/60 |
| 2013/0039579 A1* | 2/2013 | Ahn | G06T 11/60 |
| | | | 382/190 |

FOREIGN PATENT DOCUMENTS

| CN | 1622588 A | 6/2005 |
| CN | 101877764 A | 11/2010 |

(Continued)

*Primary Examiner* — Amy Hsu
(74) *Attorney, Agent, or Firm* — Shimokaji IP

(57) ABSTRACT

The embodiment of the present invention discloses a shot image processing method comprising: obtaining composition target information in initial image data captured by a lens; obtaining a corresponding target composition area according to the composition target information; and obtaining the initial image data in the target composition area so as to obtain target image data. The embodiment of the present invention also discloses a shot image processing apparatus. By adopting the present invention, for the obtained initial image data captured by the lens, the composition target information in the initial image data can be automatically obtained, the corresponding target composition area can be obtained according to the composition target information, and then the initial image data in the target composition area can be obtained so as to obtain target image data, thereby improving the intelligence of the shooting terminal.

12 Claims, 6 Drawing Sheets

(58) Field of Classification Search
CPC ........... H04N 5/23258; H04N 5/23277; H04N 5/23287; H04N 5/247
See application file for complete search history.

(56) References Cited

FOREIGN PATENT DOCUMENTS

| | | |
|---|---|---|
| CN | 101964870 A | 2/2011 |
| CN | 102404494 A | 4/2012 |
| CN | 102694976 A | 9/2012 |
| CN | 103391361 A | 11/2013 |

* cited by examiner

SHOT IMAGE PROCESSING METHOD AND APPARATUS

CROSS REFERENCE TO RELATED APPLICATIONS

This application is a continuing application of PCT Patent Application No. PCT/CN2014/070726, entitled "SHOT IMAGE PROCESSING METHOD AND APPARATUS", filed on Jan. 16, 2014, which claims priority to Chinese Patent Application No. 201310370097.0, filed on Aug. 22, 2013, both of which are hereby incorporated in its entirety by reference.

TECHNICAL FIELD

The present invention relates to the field of image processing, and in particular, relates to a shot image processing method and apparatus.

BACKGROUND

Prior shot terminals such as smart phones, digital cameras, video cameras and so on, capture the external image with a lens, and a photoelectric conversion device will convert the image captured by the lens into electrical signal, and then a display device displays the image. Specifically, the lens refracts the external light to the photoelectric conversion device, and then the photoelectric conversion device converts a part of the light into electrical signal to form initial image data the size of which is A*B (A, B are positive numbers greater than zero). Then, partial image data in the initial image data is captured for facilitating display or storage, to obtain new image data the size of which is a*b (a, b are positive numbers greater than zero, a being less than A, b being less than B). Then, the new image data is sent to a displayer for display or to a memory for storage.

When partial image data in the initial image data is captured, the partial image data in the initial image data is identically captured. For example, if the size of the initial image data is 1000*600 and the central point is $O_1$, the new image data the size of which is 500*300 is captured identically while $O_1$ is regarded as the central point, that is to say, the size of viewfinder is 500*300 and the central point $O_2$ of the viewfinder overlaps with the central point $O_1$ of the initial image data. However, in the actual shooting process, users always hope a target to be shot, such as a scene or a person, is located at a particular place (for example, a person is in the middle or at the golden section point). Users need to manually adjust the shooting direction or shooting angle of a shooting terminal so as to enable a target such as a scene or a person to be located at a particular place. The manual operation of users leads to inaccurate shot image data and great errors.

SUMMARY

Embodiments of the present invention provide a shot image processing method and apparatus by which users need not to manually adjust the shooting direction or shooting angle of a shooting terminal so as to enable a target such as a scene or a person to be located at a particular place, and the intelligence of the shooting terminal is improved.

An embodiment of the present invention provides a shot image data processing method, comprising: obtaining composition target information in initial image data captured by a lens; obtaining a corresponding target composition area according to the composition target information; and obtaining the initial image data in the target composition area so as to obtain target image data.

Accordingly, an embodiment of the present invention further provides a shot image data processing apparatus, comprising: a target information obtaining unit for obtaining composition target information in initial image data captured by a lens; a composition area obtaining unit for obtaining a corresponding target composition area according to the composition target information; and a target data processing unit for obtaining the initial image data in the target composition area so as to obtain target image data.

By implementing the embodiments of the present invention, users need not to manually adjust the shooting direction or shooting angle of a shooting terminal so as to enable a target such as a scene or a person to be located at a particular place, and for the obtained initial image data captured by the lens, the composition target information in the initial image data can be automatically obtained, the corresponding target composition area can be obtained according to the composition target information, and then the initial image data in the target composition area can be obtained so as to obtain target image data, thereby improving the intelligence of the shooting terminal.

BRIEF DESCRIPTION OF THE DRAWINGS

In order to more clearly describe technical solutions according to embodiments of the present invention, the accompanying drawings used for describing the embodiments will be briefly introduced hereinafter. Apparently, the accompanying drawings described hereinafter show some embodiments of the present invention, and persons skilled in the art may also derive other drawings from these accompanying drawings without creative efforts.

DETAILED DESCRIPTION

In conjunction with the drawings in the embodiments of the present invention, a clear, complete description for the technical solutions in the embodiments of the present invention is provided below. Apparently, the described embodiments are a part rather than all of the embodiments of the present invention. All other embodiments obtained by persons skilled in the art according to the embodiments of the present invention without creative efforts should fall within the protection scope of the present invention.

The embodiments of the present invention provide a shot image processing method and apparatus comprising: obtaining composition target information in initial image data captured by a lens; obtaining a corresponding target composition area according to the composition target information; and obtaining the initial image data in the target composition area so as to obtain target image data. The shot image processing method according to the embodiment of the present invention may be implemented by terminals capable of shooting, such as smart phones, digital cameras, video cameras and so on. The embodiment of the present invention is suitable for processing before the formation of the shot image.

In prior art, a lens refracts external light to a photoelectric conversion device, and then the photoelectric conversion device converts a part of the light into electrical signal to form initial image data. When partial image data in the initial image data is captured, the partial image data in the initial image data is identically captured, and then is stored or sent to a display screen for display so as to form an image. If users always hope a target to be shot, such as a scene or a person, is located at a particular place (for example, a person is in the middle or at the golden section point), before shooting, for example pressing a "shutter" button, users need to manually adjust the shooting direction or shooting angle of a shooting terminal so as to enable a target such as a scene or a person to be located at a particular place. The manual operation of users leads to inaccurate shot image data and great errors.

By implementing the present invention, users need not to manually adjust the shooting direction or shooting angle of a shooting terminal so as to enable a target such as a scene or a person to be located at a particular place, and the composition target information in the initial image data can be automatically obtained, the corresponding target composition area can be obtained according to the composition target information, and then the initial image data in the target composition area can be obtained so as to obtain target image data, thereby improving the intelligence of the shooting terminal. Hereinafter, a description by way of embodiments is provided.

Figure 1:
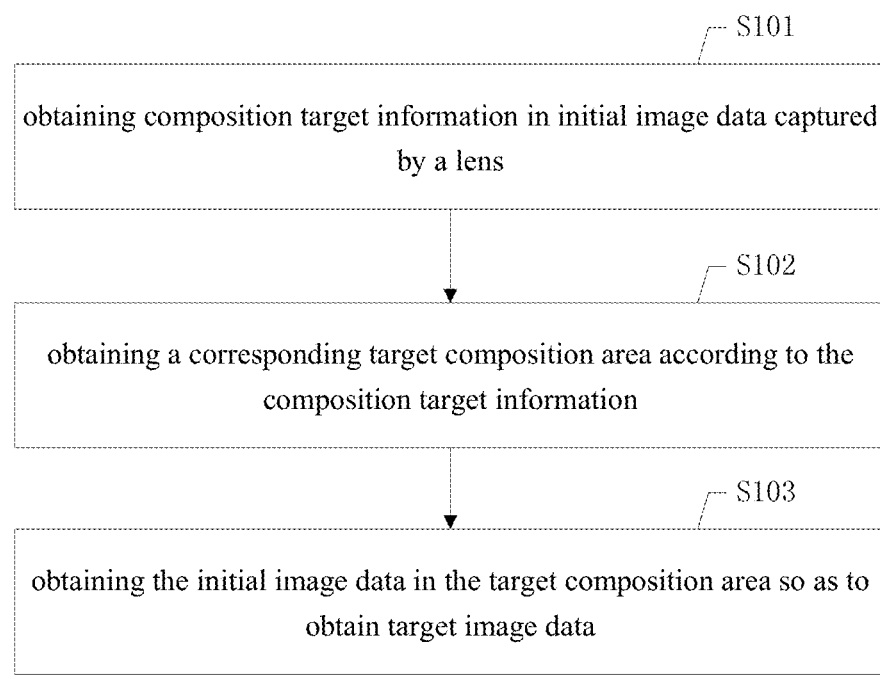
FIG. 1 is a flowchart of a shot image processing method according to an embodiment of the present invention.

Referring to FIG. 1, it is a flowchart of a shot image processing method according to an embodiment of the present invention. The shot image processing method according to the embodiment of the present invention may be implemented by terminals capable of shooting, such as smart phones, digital cameras, video cameras and so on. The method may include the following steps S101-S103.

Step S101 is obtaining composition target information in initial image data captured by a lens.

As an alternative embodiment, the terminal captures the external image with the lens which refracts the external light to a photoelectric conversion device. The photoelectric conversion device converts a part of the light into electrical signals to form the initial image data. The composition target information may include preset composition target composition, first composition target information, second composition target information, and so on. The preset composition target information is the composition target information preset by users or preset by default by the terminal, such as central point information of person composition, central point information of scene composition, golden section point information of composition, preset composition ratio point information, or the like. The central point information of person composition, for example, refers to that the composition center is located in the center of three persons, or the composition center is located in the center of two persons, and so on. The central point information of scene composition, for example, refers to that the composition center is located in the center of two stationary objects, or the composition center is located in the center of a tree, and so on. The golden section point information of composition, for example, refers to that the composition center is located at the golden section point of the horizontal axis, or the composition center is located at the golden section point of the longitudinal axis. The preset composition ratio information, for example, refers to that the composition center is located in the horizontal golden section line, or the composition center is located in a place dividing a axis at a ratio of 2:5, or the composition center is located in a place dividing a axis at a ratio of 3:4, and so on.

As an alternative embodiment, the initial image data captured by the lens is analyzed to obtain the default initial composition area in the initial image data. For example, if the size of the initial image data is 1000*600 and the central point is $O_1$, an area the central point of which is $O_1$ and the size of which is 500*300 is regarded as the initial composition area. A first composition target in the initial composition area is obtained, and the position of the first composition target in the initial image data is calculated, so as to obtain the first composition target information. It is judged whether the first composition target information in the initial composition area is consistent with the preset composition target information. If not, a second composition target in the initial image data is obtained according to the preset composition target information. The position information of the second composition target in the initial image data is calculated, so as to obtain second composition target information. The first composition target may be specific composition target point, for example, the central point of the initial composition area, a focus point during shooting, and so on. The first composition target information, the second composition target information may be position information indicated with the coordinate system, information indicated with pixels, or the like.

Step S102 is obtaining a corresponding target composition area according to the composition target information.

As an alternative embodiment, the corresponding target composition area is obtained according to the composition target information, and displacement difference between the first composition target information and the second composition target information may be calculated, and then according to the calculated displacement difference, the initial composition area is moved, so as to obtain the target composition area.

Figure 6A:
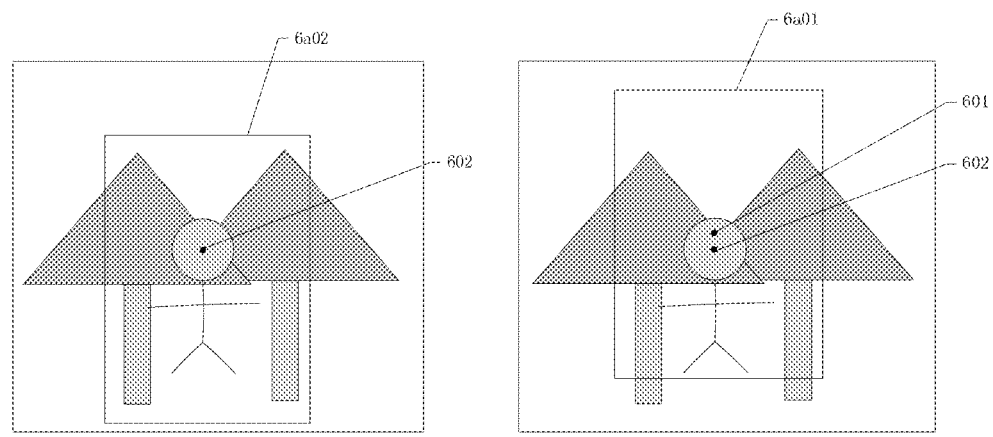
FIG. 6a is a schematic diagram of a shot image processing course according to an embodiment of the present invention.

As an alternative embodiment, as shown in FIG. 6a, it is a schematic diagram of a shot image processing course according to an embodiment of the present invention. 6a01 is the initial composition area, and 6a02 is the target composition area. The displacement difference between the first composition target 601 and the second composition target 602 is calculated, and the initial composition area 6a01 is moved according to the displacement difference, so as to obtain the target composition area 6a02.

Figure 6B:
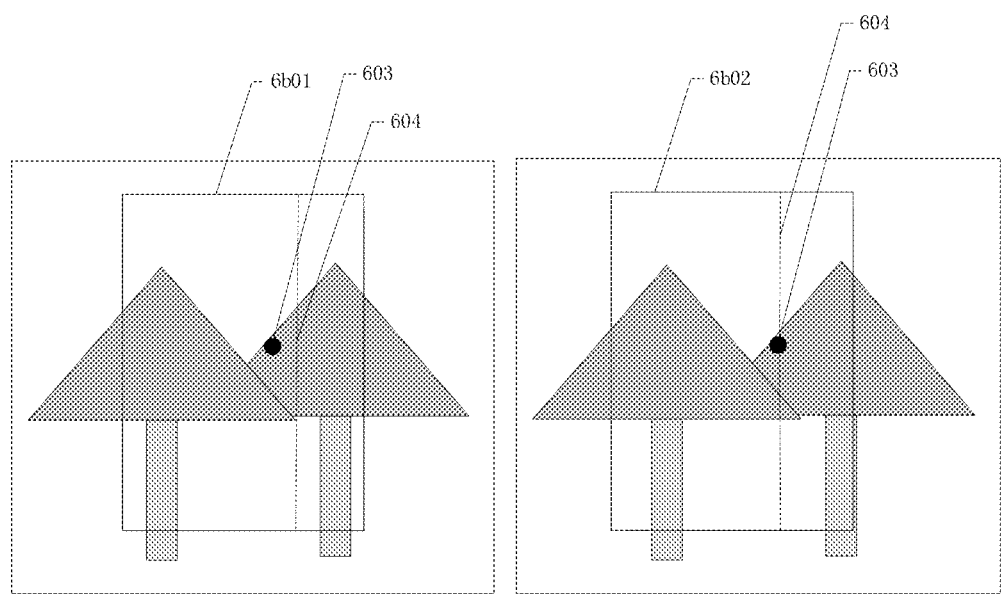
FIG. 6b is a schematic diagram of another shot image processing course according to an embodiment of the present invention.

As an alternative embodiment, as shown in FIG. 6b, it is a schematic diagram of another shot image processing course according to an embodiment of the present invention. 6b01 is the initial composition area, and 6b02 is the target composition area. The displacement difference between the first composition target 603 and the second composition target 604 is calculated, and the initial composition area 6b01 is moved according to the displacement difference, so as to obtain the target composition area 6b02.

Step S103 is obtaining the initial image data in the target composition area so as to obtain target image data.

As an alternative embodiment, the initial image data in the target composition area is obtained so as to obtain the target image data.

As an alternative embodiment, as shown in FIG. 6a, the initial image data in the target composition area 6a02 is obtained so as to obtain the target image data.

As an alternative embodiment, as shown in FIG. 6b, the initial image data in the target composition area 6b02 is obtained so as to obtain the target image data.

Furthermore, alternatively, the shot image processing method according to an embodiment of the present invention, after the step S103, may further include storing the target image data, or sending to a display screen for display.

As an alternative embodiment, after the target image data is obtained in the step S103, the target image data may be stored, or sent to a display screen for display.

The embodiment of the present invention provides a shot image processing method which may automatically obtain the composition target information in the initial image data, obtain the corresponding target composition area according to the composition target information, and then obtain the initial image data in the target composition area so as to obtain target image data. Users need not manually to adjust the shooting direction or shooting angle of a shooting terminal so as to enable a target such as a scene or a person to be located at a particular place, and the intelligence of the shooting terminal is improved.

Figure 2:
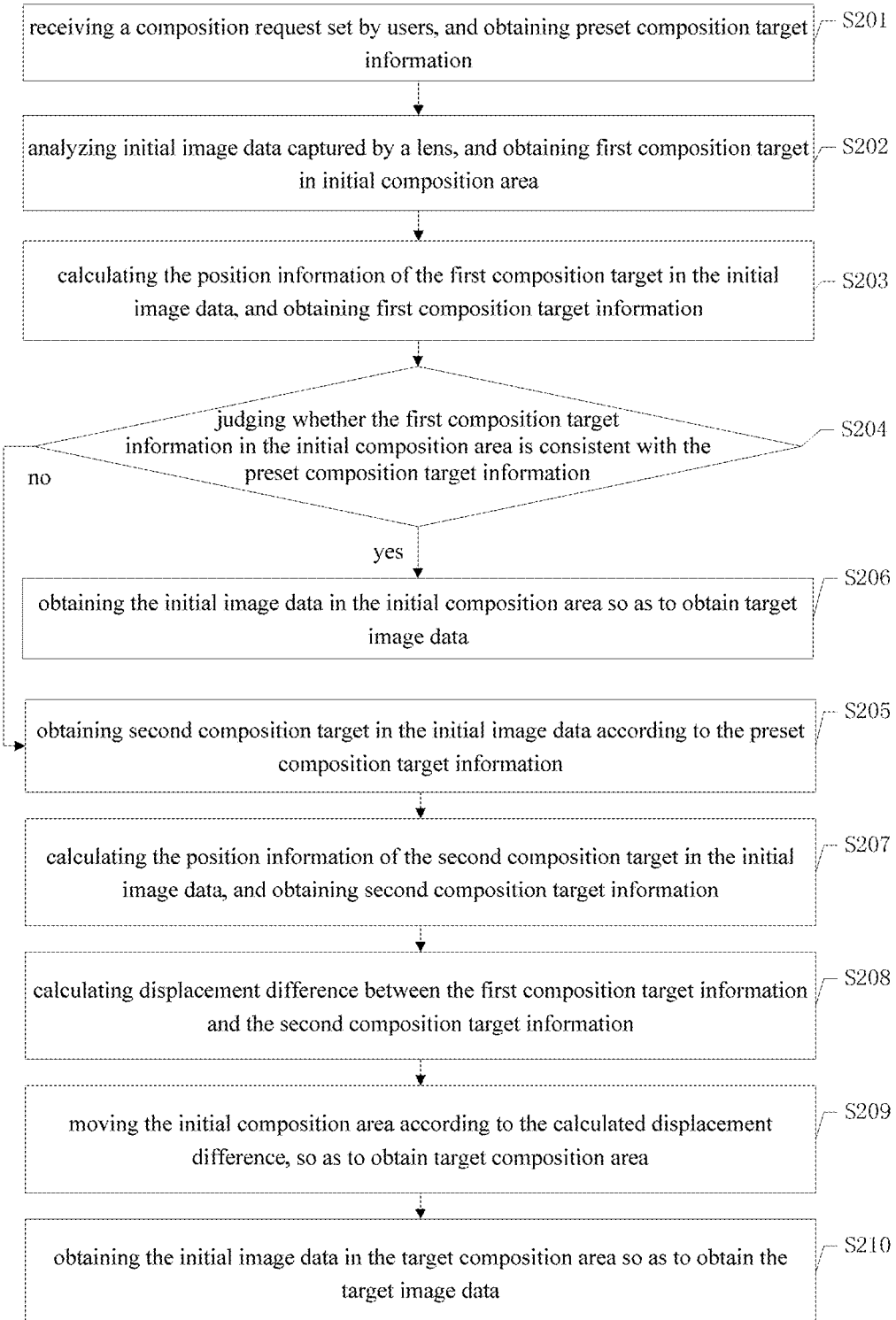
FIG. 2 is a flowchart of another shot image processing method according to an embodiment of the present invention.

Referring to FIG. 2, it is a flowchart of another shot image processing method according to an embodiment of the present invention. The shot image processing method according to the embodiment of the present invention may be implemented by terminals capable of shooting, such as smart phones, digital cameras, video cameras and so on. The method may include the following steps S201-S210.

Step S201 is receiving a composition request set by users, and obtaining preset composition target information.

As an alternative embodiment, the preset composition target information is the composition target information preset by users or preset by default by the terminal. The preset composition target information includes but is not limited to central point information of person composition, central point information of scene composition, golden section point information of composition, preset composition ratio information, or the like. The central point information of person composition, for example, refers to that the composition center is located in the center of three persons, or the composition center is located in the center of two persons, and so on. The central point information of scene composition, for example, refers to that the composition center is located in the center of two stationary objects, or the composition center is located in the center of a tree, and so on. The golden section point information of composition, for example, refers to that the composition center is located at the golden section point of the horizontal axis, or the composition center is located at the golden section point of the longitudinal axis. The preset composition ratio information, for example, refers to that the composition center is located in the horizontal golden section line, or the composition center is located in a place dividing a axis at a ratio of 2:5, or the composition center is located in a place dividing a axis at a ratio of 3:4, and so on.

As an alternative embodiment, a composition request set by users is received, for example, before shooting a image, users may set the composition request on shooting settings interface of the terminals, for example, set the composition center being located in the center of three persons, or the composition center being located in the center of two persons, or the composition center being located in the center of two stationary objects, or the composition center being located in the horizontal golden section line, or the composition center being located at the golden section point of the longitudinal axis. According to the received composition request set by users, the preset composition target information is obtained.

Step S202 is analyzing initial image data captured by a lens, and obtaining first composition target in initial composition area.

As an alternative embodiment, the initial image data captured by the lens is analyzed to obtain the default initial composition area in the initial image data. For example, if the size of the initial image data is 1000*600 and the central point is $O_1$, an area the central point of which is $O_1$ and the size of which is 500*300 is regarded as the initial composition area. The first composition target may be specific composition target point, for example, the central point of the initial composition area, a focus point during shooting, and so on.

As an alternative embodiment, as shown in FIG. 6a, it is a schematic diagram of processing a shot image in the case that the composition request set by users that the composition center is located in the center of head portrait is received. The preset composition target information is that the composition center is located in the center of the head portrait. The initial composition area 6a01 is obtained, and the first composition target 601 in the initial composition area 6a01 is obtained. The first composition target 601 is the central point of the composition of the initial composition area 6a01.

As an alternative embodiment, as shown in FIG. 6b, it is a schematic diagram of processing a shot image in the case that the composition request set by users that the composition center is located in the longitudinal golden section line is received. The preset composition target information is that the composition center is located in the longitudinal golden section line. The initial composition area 6b01 is obtained, and the first composition target 603 in the initial composition area 6b01 is obtained. The first composition target 603 is a focus point during shooting.

Step S203 is calculating the position information of the first composition target in the initial image data, and obtaining first composition target information.

As an alternative embodiment, the position information of the first composition target in the initial image data is calculated, so as to obtain the first composition target information. The first composition target information may be position information indicated with the coordinate system, information indicated with pixels, or the like.

As an alternative embodiment, as shown in FIG. 6a, the position information of the first composition target 601 in the initial image data is calculated. Specifically, a two-dimensional coordinate system may be built, and the first composition target 601 may be indicated with the coordinate $(x_1, y_1)$.

As an alternative embodiment, as shown in FIG. 6b, the position information of the first composition target 603 in the initial image data is calculated. Specifically, a two-dimensional coordinate system may be built, and the first composition target 603 may be indicated with the coordinate $(x_3, y_3)$.

Step S204 is judging whether the first composition target information in the initial composition area is consistent with the preset composition target information. If so, the step S206 is performed; if not, the step S205 is performed.

As an alternative embodiment, it is judged whether the first composition target information in the initial composition area is consistent with the preset composition target information, and the initial image data is analyzed to obtain the specific position information of the preset composition target information corresponding to the initial image data, and then, it is judged whether the first composition target information in the initial composition area is consistent with the specific position information of the preset composition target information corresponding to the initial image data.

As an alternative embodiment, as shown in FIG. 6a, it is judged whether the position information of the first composition target 601 in the initial image data is consistent with the preset composition target information. The preset composition target information is that the composition center is located in the center of the head portrait. The initial image data is analyzed to obtain the position information of two stationary objects, so as to judge whether the position information of the first composition target 601 in the initial image data is located in the center of the head portrait.

As an alternative embodiment, as shown in FIG. 6b, it is judged whether the position information of the first composition target 603 in the initial image data is consistent with the preset composition target information. The preset composition target information is that the composition center is located in the longitudinal golden section line. The initial image data is analyzed to obtain the position information of the longitudinal golden section line, so as to judge whether the position information of the first composition target 603 in the initial image data is located in the longitudinal golden section line.

Step S205 is obtaining second composition target in the initial image data according to the preset composition target information.

As an alternative embodiment, if it is determined that the first composition target information in the initial composition area is inconsistent with the preset composition target information at the step S204, the second composition target in the initial image data is obtained according to the preset composition target information. The second composition target may be target point, target line of the preset composition target information corresponding to the initial image data, and so on.

As an alternative embodiment, as shown in FIG. 6a, the preset composition target information is that the composition center is located in the center of the head portrait. The initial image data is analyzed to obtain the portrait data which is analyzed to obtain the center of the head portrait as the second composition target.

As an alternative embodiment, as shown in FIG. 6b, the preset composition target information is that the composition center is located in the longitudinal golden section line. The initial image data is analyzed to obtain the longitudinal golden section line as the second composition target.

Step S206 is obtaining the initial image data in the initial composition area so as to obtain target image data.

As an alternative embodiment, if it is determined that the first composition target information in the initial composition area is consistent with the preset composition target information, the initial image data in the initial composition area is obtained so as to obtain the target image data.

Step S207 is calculating the position information of the second composition target in the initial image data, and obtaining second composition target information.

As an alternative embodiment, the position information of the second composition target in the initial image data is calculated, so as to obtain the second composition target information. The second composition target information may be position information indicated with the coordinate system, information indicated with pixels, or the like.

As an alternative embodiment, as shown in FIG. 6a, the position information of the second composition target 602 in the initial image data is calculated. Specifically, a two-dimensional coordinate system may be built, and the second composition target 602 may be indicated with the coordinate $(x_2, y_2)$.

As an alternative embodiment, as shown in FIG. 6b, the position information of the second composition target 604 in the initial image data is calculated. Specifically, a two-dimensional coordinate system may be built, and the second composition target 604 may be indicated with the coordinate $(x_4, y_4)$.

Step S208 is calculating displacement difference between the first composition target information and the second composition target information.

As an alternative embodiment, the displacement difference between the first composition target information and the second composition target information is calculated, and may be calculated with position information indicated with the coordinate system, or information indicated with pixels.

As an alternative embodiment, as shown in FIG. 6a, the displacement difference $(x_1-x_2, y_1-y_2)$ between the position information $(x_1, y_1)$ of the first composition target 601 in the initial image data and the position information $(x_2, y_2)$ of the second composition target 602 in the initial image data is calculated.

As an alternative embodiment, as shown in FIG. 6b, the displacement difference $(x_3-x_4, y_3-y_4)$ between the position information $(x_3, y_3)$ of the first composition target 603 in the initial image data and the position information $(x_4, y_4)$ of the second composition target 604 in the initial image data is calculated.

Step S209 is moving the initial composition area according to the calculated displacement difference, so as to obtain target composition area.

As an alternative embodiment, the direction and the displacement distance of the movement depends on the calculated displacement difference. The initial composition area is moved according to the calculated displacement difference, so as to obtain the target composition area.

As an alternative embodiment, as shown in FIG. 6a, because of $x_1-x_2=0$, the initial composition area 6a01 need not be moved in the horizontal direction, and is moved downward by a displacement of $|y_1-y_2|$ in the longitudinal axis to obtain the target composition area 6a02.

As an alternative embodiment, as shown in FIG. 6b, because of $y_3-y_4=0$, the initial composition area 6b01 need not be moved in the longitudinal direction, and is moved left by a displacement of $|x_3-x_4|$ in the horizontal axis to obtain the target composition area 6b02.

Step S210 is obtaining the initial image data in the target composition area so as to obtain the target image data.

As an alternative embodiment, the initial image data in the target composition area is obtained so as to obtain the target image data.

As an alternative embodiment, as shown in FIG. 6a, the initial image data in the target composition area 6a02 is obtained so as to obtain the target image data.

As an alternative embodiment, as shown in FIG. 6*b*, the initial image data in the target composition area 6*b*02 is obtained so as to obtain the target image data.

The embodiments of the present invention provides a shot image processing method which may receive a composition request set by users, obtain preset composition target information, if it is determined that the first composition target information in the initial composition area is inconsistent with the preset composition target information, obtain the second composition target information according to the preset composition target information, calculate displacement difference between the first composition target information and the second composition target information, then obtain the initial image data in the target composition area so as to obtain the target image data. Users need not to manually adjust the shooting direction or shooting angle of a shooting terminal such that a target such as a scene or a person to be located at a particular place, and the intelligence of the shooting terminal is improved.

Figure 3:
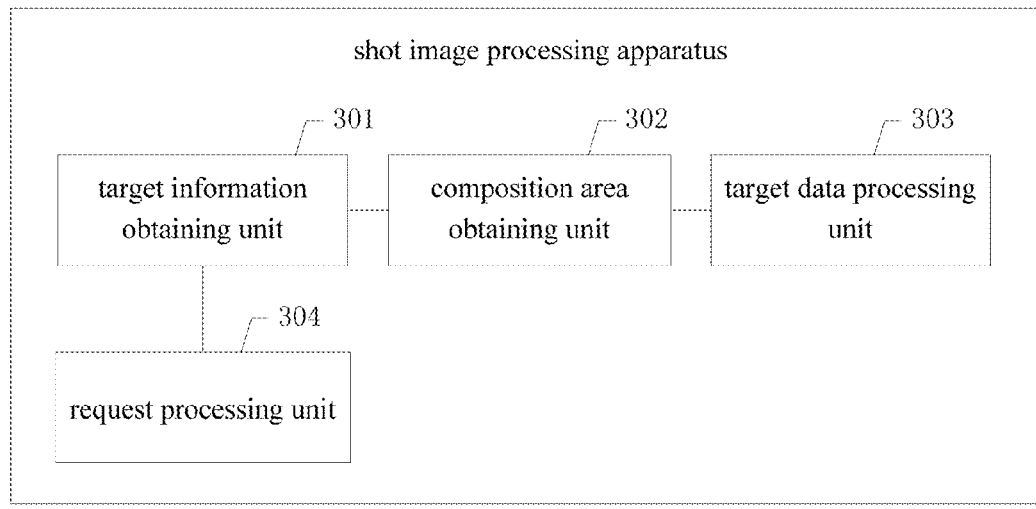
FIG. 3 is a schematic structural diagram of a shot image processing apparatus according to an embodiment of the present invention.

In conjunction with FIG. 3, a shot image processing apparatus according to an embodiment of the present invention is described in detail hereinafter. It should be noted that the shot image processing apparatus as shown in FIG. 3 is for implementing the method according to the embodiment as shown in any one of FIG. 1~2 of the present invention, and is an implementing body for the shot image processing method according to any one of FIG. 1~2. For convenience of explanation, only those relevant to the embodiment of the present invention are shown. The specific technical details which are not disclosed may be known with reference to the embodiments as shown in FIG. 1~2 of the present invention.

As shown in FIG. 3, it is a schematic structural diagram of a shot image processing apparatus according to an embodiment of the present invention. The apparatus according to an embodiment of the present invention may be a terminal capable of shooting, such as a smart phone, a digital camera, a video camera and so on. The apparatus may at least include a target information obtaining unit 301, a composition area obtaining unit 302 and a target data processing unit 303.

The target information obtaining unit 301 is for obtaining composition target information in initial image data captured by a lens.

As an alternative embodiment, the terminal captures the external image with the lens which refracts the external light to a photoelectric conversion device. The photoelectric conversion device converts a part of the light into electrical signals to form the initial image data. The composition target information may include preset composition target composition, first composition target information, second composition target information, and so on. The preset composition target information is the composition target information preset by users or preset by default by the terminal, such as central point information of person composition, central point information of scene composition, golden section point information of composition, preset composition ratio information, or the like. The central point information of person composition, for example, refers to that the composition center is located in the center of three persons, or the composition center is located in the center of two persons, and so on. The central point information of scene composition, for example, refers to that the composition center is located in the center of two stationary objects, or the composition center is located in the center of a tree, and so on. The golden section point information of composition, for example, refers to that the composition center is located at the golden section point of the horizontal axis, or the composition center is located at the golden section point of the longitudinal axis. The preset composition ratio information, for example, refers to that the composition center is located in the horizontal golden section line, or the composition center is located in a place dividing a axis at a ratio of 2:5, or the composition center is located in a place dividing a axis at a ratio of 3:4, and so on.

As an alternative embodiment, the target information obtaining unit 301 analyzes the initial image data captured by the lens, and obtains the default initial composition area in the initial image data. For example, if the size of the initial image data is 1000*600 and the central point is $O_1$, an area the central point of which is $O_1$ and the size of which is 500*300 is regarded as the initial composition area. A first composition target in the initial composition area is obtained, and the position of the first composition target in the initial image data is calculated, so as to obtain the first composition target information. It is judged whether the first composition target information in the initial composition area is consistent with the preset composition target information. If not, a second composition target in the initial image data is obtained according to the preset composition target information. The position information of the second composition target in the initial image data is calculated, so as to obtain second composition target information. The first composition target may be specific composition target point, for example, the central point of the initial composition area, a focus point during shooting, and so on. The first composition target information, the second composition target information may be position information indicated with the coordinate system, information indicated with pixels, or the like.

The composition area obtaining unit 302 is for obtaining a corresponding target composition area according to the composition target information.

As an alternative embodiment, the composition area obtaining unit 302 obtains the corresponding target composition area according to the composition target information, and may calculate displacement difference between the first composition target information and the second composition target information, and then according to the calculated displacement difference, moves the initial composition area, so as to obtain the target composition area.

As an alternative embodiment, as shown in FIG. 6*a*, 6*a*01 is the initial composition area, and 6*a*02 is the target composition area. The displacement difference between the first composition target 601 and the second composition target 602 is calculated, and the initial composition area 6*a*01 is moved according to the displacement difference, so as to obtain the target composition area 6*a*02.

As an alternative embodiment, as shown in FIG. 6*b*, 6*b*01 is the initial composition area, and 6*b*02 is the target composition area. The displacement difference between the first composition target 603 and the second composition target 604 is calculated, and the initial composition area 6*b*01 is moved according to the displacement difference, so as to obtain the target composition area 6*b*02.

The target data processing unit 303 is for obtaining the initial image data in the target composition area so as to obtain target image data.

As an alternative embodiment, the target data processing unit 303 obtains the initial image data in the target composition area so as to obtain the target image data.

As an alternative embodiment, as shown in FIG. 6*a*, the initial image data in the target composition area 6*a*02 is obtained so as to obtain the target image data.

As an alternative embodiment, as shown in FIG. 6b, the initial image data in the target composition area 6b02 is obtained so as to obtain the target image data.

Furthermore, alternatively, after obtaining the target image data, the target data processing unit 303 may further store the target image data, or send the target image data to a display screen for display.

Furthermore, alternatively, the shot image processing apparatus according to the embodiment of the present invention may further include a request processing unit 304 for receiving a composition request set by users to obtain the preset composition target information.

As an alternative embodiment, the preset composition target information is the composition target information preset by users or preset by default by the terminal. A composition request set by users is received, for example, before shooting a image, users may set the composition request on shooting settings interface of the terminals, for example, set the composition center being located in the center of three persons, or the composition center being located in the center of two persons, or the composition center being located in the center of two stationary objects, or the composition center being located in the horizontal golden section line, or the composition center being located at the golden section point of the longitudinal axis. According to the received composition request set by users, the preset composition target information is obtained.

The embodiment of the present invention provides a shot image processing apparatus. The target information obtaining unit may automatically obtain the composition target information in the initial image data; the composition area obtaining unit obtains the corresponding target composition area according to the composition target information; and the target data processing unit obtains the initial image data in the target composition area so as to obtain target image data. Users need not to manually adjust the shooting direction or shooting angle of a shooting terminal so as to enable a target such as a scene or a person to be located at a particular place, and the intelligence of the shooting terminal is improved.

In conjunction with FIG. 4~5, the structure and function of the target information obtaining unit and the composition area obtaining unit are described in detail hereinafter, respectively.

Figure 4:
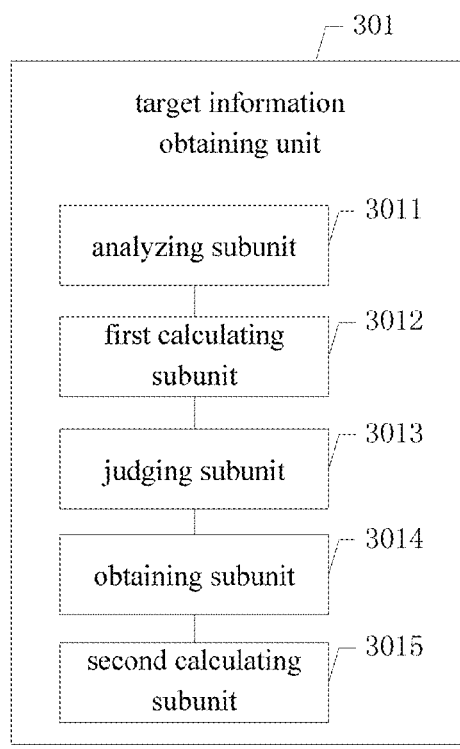
FIG. 4 is a schematic structural diagram of a target information obtaining unit according to an embodiment of the present invention.

Referring to FIG. 4, it is a schematic structural diagram of a target information obtaining unit according to an embodiment of the present invention. The target information obtaining unit 301 may include an analyzing subunit 3011, a first calculating subunit 3012, a judging subunit 3013, an obtaining subunit 3014, and a second calculating subunit 3015.

The analyzing subunit 3011 is for analyzing the initial image data captured by the lens, and obtaining the first composition target in the initial composition area.

As an alternative embodiment, the analyzing subunit 3011 analyzes the initial image data captured by the lens to obtain the default initial composition area in the initial image data. For example, if the size of the initial image data is 1000*600 and the central point is $O_1$, an area the central point of which is $O_1$ and the size of which is 500*300 is regarded as the initial composition area. The first composition target may be specific composition target point, for example, the central point of the initial composition area, a focus point during shooting, and so on.

As an alternative embodiment, as shown in FIG. 6a, it is a schematic diagram of processing a shot image in the case that the composition request set by users that the composition center is located in the center of head portrait is received. The preset composition target information is that the composition center is located in the center of the head portrait. The initial composition area 6a01 is obtained, and the first composition target 601 in the initial composition area 6a01 is obtained. The first composition target 601 is the central point of the composition of the initial composition area 6a01.

As an alternative embodiment, as shown in FIG. 6b, it is a schematic diagram of processing a shot image in the case that the composition request set by users that the composition center is located in the longitudinal golden section line is received. The preset composition target information is that the composition center is located in the longitudinal golden section line. The initial composition area 6b01 is obtained, and the first composition target 603 in the initial composition area 6b01 is obtained. The first composition target 603 is a focus point during shooting.

The first calculating subunit 3012 is for calculating the position information of the first composition target in the initial image data, and obtaining the first composition target information.

As an alternative embodiment, the first calculating subunit 3012 calculates the position information of the first composition target in the initial image data is, so as to obtain the first composition target information. The first composition target information may be position information indicated with the coordinate system, information indicated with pixels, or the like.

As an alternative embodiment, as shown in FIG. 6a, the position information of the first composition target 601 in the initial image data is calculated. Specifically, a two-dimensional coordinate system may be built, and the first composition target 601 may be indicated with the coordinate $(x_1, y_1)$.

As an alternative embodiment, as shown in FIG. 6b, the position information of the first composition target 603 in the initial image data is calculated. Specifically, a two-dimensional coordinate system may be built, and the first composition target 603 may be indicated with the coordinate $(x_3, y_3)$.

The judging subunit 3013 is for judging whether the first composition target information in the initial composition area is consistent with the preset composition target information.

As an alternative embodiment, the judging subunit 3013 judges whether the first composition target information in the initial composition area is consistent with the preset composition target information, and analyzes the initial image data to obtain the specific position information of the preset composition target information corresponding to the initial image data, and then judges whether the first composition target information in the initial composition area is consistent with the specific position information of the preset composition target information corresponding to the initial image data.

As an alternative embodiment, as shown in FIG. 6a, it is judged whether the position information of the first composition target 601 in the initial image data is consistent with the preset composition target information. The preset composition target information is that the composition center is located in the center of the head portrait. The initial image data is analyzed to obtain the position information of two stationary objects, so as to judge whether the position information of the first composition target 601 in the initial image data is located in the center of the head portrait.

As an alternative embodiment, as shown in FIG. 6b, it is judged whether the position information of the first composition target 603 in the initial image data is consistent with the preset composition target information. The preset composition target information is that the composition center is located in the longitudinal golden section line. The initial image data is analyzed to obtain the position information of the longitudinal golden section line, so as to judge whether the position information of the first composition target 603 in the initial image data is located in the longitudinal golden section line.

As an alternative embodiment, if the judgment result of the judging subunit 3013 is yes, the initial image data in the initial composition area is obtained to obtain and store target image data.

The obtaining subunit 3014 is for obtaining the second composition target in the initial image data according to the preset composition target information, when the judgment result of the judging subunit 3013 is no.

As an alternative embodiment, if the obtaining subunit 3014 determines that the first composition target information in the initial composition area is inconsistent with the preset composition target information, the second composition target in the initial image data is obtained according to the preset composition target information. The second composition target may be target point, target line of the preset composition target information corresponding to the initial image data, and so on.

As an alternative embodiment, as shown in FIG. 6a, the preset composition target information is that the composition center is located in the center of the head portrait. The initial image data is analyzed to obtain the portrait data which is analyzed to obtain the center of the head portrait as the second composition target.

As an alternative embodiment, as shown in FIG. 6b, the preset composition target information is that the composition center is located in the longitudinal golden section line. The initial image data is analyzed to obtain the longitudinal golden section line as the second composition target.

The second calculating subunit 3015 is for calculating the position information of the second composition target in the initial image data, and obtaining the second composition target information.

As an alternative embodiment, the second calculating subunit 3015 calculates the position information of the second composition target in the initial image data, so as to obtain the second composition target information. The second composition target information may be position information indicated with the coordinate system, information indicated with pixels, or the like.

As an alternative embodiment, as shown in FIG. 6a, the position information of the second composition target 602 in the initial image data is calculated. Specifically, a two-dimensional coordinate system may be built, and the second composition target 602 may be indicated with the coordinate $(x_2, y_2)$.

As an alternative embodiment, as shown in FIG. 6b, the position information of the second composition target 604 in the initial image data is calculated. Specifically, a two-dimensional coordinate system may be built, and the second composition target 604 may be indicated with the coordinate $(x_4, y_4)$.

It should be noted that the structure and function of the target information obtaining unit as shown in FIG. 4 may be specifically implemented with the methods according to the embodiments as shown in FIG. 1, FIG. 2 of the present invention. The specific implementation process may be known with reference to the description for the embodiments as shown in FIG. 1, FIG. 2, and is not repeated here.

Figure 5:
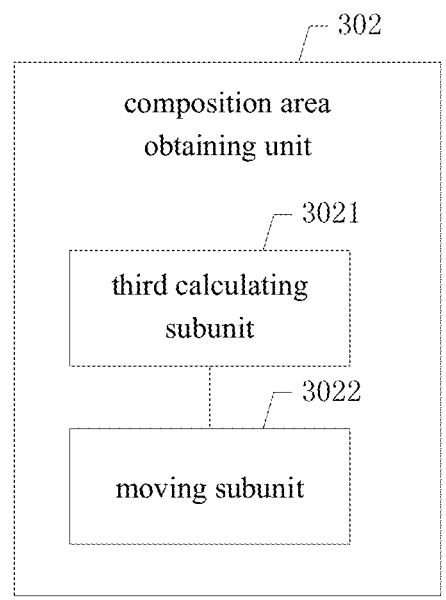
FIG. 5 is a schematic structural diagram of a composition area obtaining unit according to an embodiment of the present invention.

Referring to FIG. 5, it is a schematic structural diagram of the composition area obtaining unit according to an embodiment of the present invention. The composition area obtaining unit 302 may include a third calculating subunit 3021, and a moving subunit 3022.

The third calculating subunit 3021 is for calculating displacement difference between the first composition target information and the second composition target information.

As an alternative embodiment, the third calculating subunit 3021 calculates the displacement difference between the first composition target information and the second composition target information which may be calculated with position information indicated with the coordinate system, or information indicated with pixels.

As an alternative embodiment, as shown in FIG. 6a, the displacement difference $(x_1-x_2, y_1-y_2)$ between the position information $(x_1, y_1)$ of the first composition target 601 in the initial image data and the position information $(x_2, y_2)$ of the second composition target 602 in the initial image data is calculated.

As an alternative embodiment, as shown in FIG. 6b, the displacement difference $(x_3-x_4, y_3-y_4)$ between the position information $(x_3, y_3)$ of the first composition target 603 in the initial image data and the position information $(x_4, y_4)$ of the second composition target 604 in the initial image data is calculated.

The moving subunit 3022 is for moving the initial composition area according to the calculated displacement difference, so as to obtain the target composition area.

As an alternative embodiment, the moving subunit 3022 decides the direction and the displacement distance of the movement according to the calculated displacement difference, and moves the initial composition area according to the calculated displacement difference so as to obtain the target composition area.

As an alternative embodiment, as shown in FIG. 6a, because of $x_1-x_2=0$, the initial composition area 6a01 need not be moved in the horizontal direction, and is moved downward by a displacement of $|y_1-y_2|$ in the longitudinal axis to obtain the target composition area 6a02.

As an alternative embodiment, as shown in FIG. 6b, because of $y_3-y_4=0$, the initial composition area 6b01 need not be moved in the longitudinal direction, and is moved left by a displacement of $|x_3-x_4|$ in the horizontal axis to obtain the target composition area 6b02.

It should be noted that the structure and function of the composition area obtaining unit as shown in FIG. 5 may be specifically implemented with the methods according to the embodiments as shown in FIG. 1, FIG. 2 of the present invention. The specific implementation process may be known with reference to the description for the embodiments as shown in FIG. 1, FIG. 2, and is not repeated here.

Figure 7:
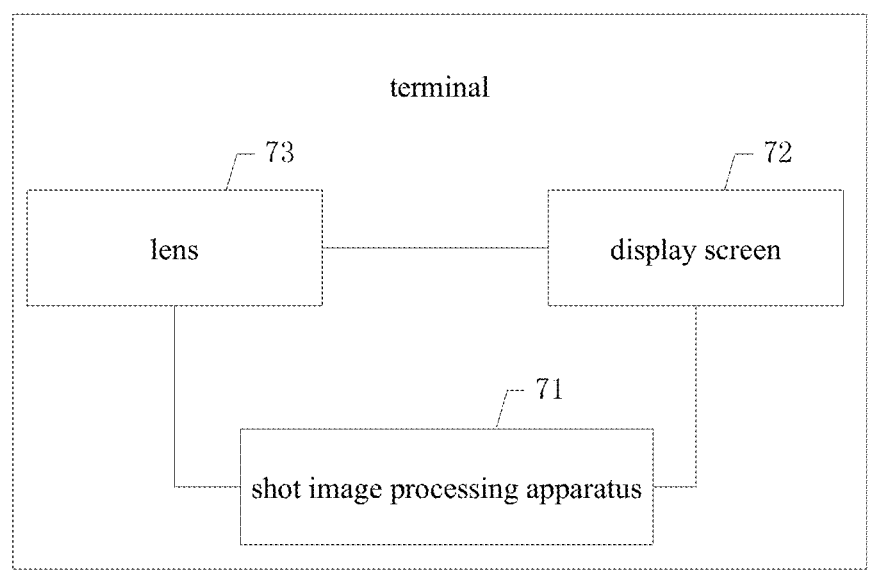
FIG. 7 is a schematic structural diagram of a terminal according to an embodiment of the present invention.

An embodiment of the present invention also discloses a terminal. As shown in FIG. 7, it is a schematic structural diagram of a terminal according to an embodiment of the present invention. As shown in the figure, the terminal according to the embodiment of the present invention may include a shot image processing apparatus 71, a display screen 72 and a lens 73. The display screen 72 is connected to the shot image processing apparatus 71. The shot image processing apparatus 71 is connected to the lens 73. The lens 73 is connected to the display screen 72. The shot image processing apparatus 71 is the apparatus as shown in FIG. 3~FIG. 5 which includes a target information obtaining unit, a composition area obtaining unit and a target data processing unit, and furthermore, alternatively, may include a request processing unit. The structure and function of the apparatus may be known with reference to the description for the embodiments as shown in FIG. 3~5, and is not repeated here. The lens is connected to the target information obtaining unit in the apparatus 71. The display screen 72 is connected to the request processing unit in the apparatus. It should be noted that the server according to the embodiment is corresponding to the shot image processing method as shown in FIG. 1, FIG. 2, and is an implementing body for the shot image processing method according to FIG. 1, FIG. 2. The terminal according to the embodiment of the present invention may be a terminal capable of shooting, such as a smart phone, a digital camera, a video camera and so on.

Figure 8:
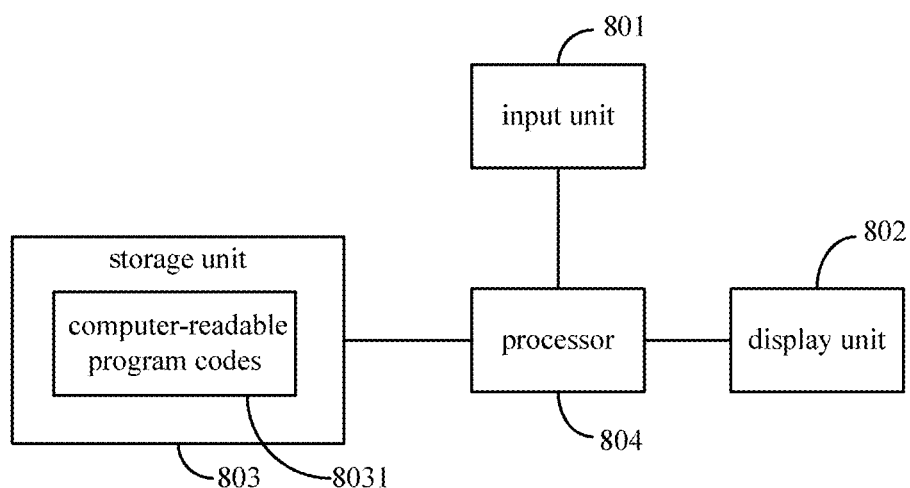
FIG. 8 is a schematic structural diagram of a terminal according to an embodiment of the present invention.

Referring to FIG. 8, it is a schematic structural diagram of a terminal according to an embodiment of the present invention. The communication terminal can include but not limited to an input unit 801, a display unit 802, a storage unit 803 and a processor 804. The input unit 801, the display unit 802, and the storage unit 803 are electrically connected to the processor 804.

The input unit 801 is configured to input information to the terminal, such as letters. The input unit 801 may be but not limited to a physical keyboard, a touch screen, or a combination of the physical keyboard and the touch screen.

The display unit 802 is configured to display visual information, such as text, image. The display unit 802 may be an LED display screen.

The storage unit 803 is configured to store a plurality of computer-readable program codes 8031. The storage unit 803 can be a read only memory (ROM), a random access memory (RAM), a U-disk, a removable hard disk, etc.

The processor 804 can include multiple cores for multi-thread or parallel processing. In this embodiment, the processor 804 is configured to execute the plurality of computer-readable program codes 8031 to obtain composition target information in initial image data captured by a lens; obtain a corresponding target composition area according to the composition target information; and obtain the initial image data in the target composition area so as to obtain target image data.

In this embodiment, the processor 804 is configured to execute the plurality of computer-readable program codes 8031 to analyze the initial image data captured by the lens, and obtain first composition target in initial composition area; calculate the position information of the first composition target in the initial image data, and obtain first composition target information; judge whether the first composition target information in the initial composition area is consistent with preset composition target information; obtain second composition target in the initial image data according to the preset composition target information, if the first composition target information in the initial composition area is not consistent with the preset composition target information; and calculate position information of the second composition target in the initial image data, and obtaining second composition target information.

In this embodiment, the processor 804 is configured to execute the plurality of computer-readable program codes 8031 to calculate displacement difference between the first composition target information and the second composition target information; and move the initial composition area according to the calculated displacement difference, so as to obtain the target composition area.

In this embodiment, before obtaining the composition target information in the initial image data captured by the lens, the processor 804 is configured to execute the plurality of computer-readable program codes 8031 to receive a composition request set by users, and obtain the preset composition target information.

In this embodiment, the preset composition target information includes central point information of person composition, central point information of scene composition, golden section point information of composition, or preset composition ratio information.

According to actual requirements, the steps in the methods of the embodiments of the present invention may be combined and deleted, and their sequence may be adjusted.

The units or subunits in the terminal of the embodiments of the present invention may be combined, divided, and deleted according to actual requirements.

The units or subunits in the embodiments of the present invention may be implemented with a general integrated circuit, for example, CPU, or an ASIC (Application Specific Integrated Circuit).

Persons skilled in the art may understand that all or a part of flowchart in the methods in the foregoing embodiments may be implemented by a program instructing relevant hardware. The program may be stored in a computer-readable storage medium. When the program runs, the processes of the foregoing method embodiments may be included. The storage medium may be a magnetic disk, an optical disc, a read-only memory (ROM), a random access memory (RAM), or the like.

The foregoing embodiments are merely preferred embodiments of the present invention and are not intended to limit the scope of the claims of the present invention. Any equivalent variance made according to the claims of the present invention shall fall within the scope of the present invention.

What is claimed is:

1. A shot image data processing method, comprising:
   obtaining composition target information in initial image data captured by a lens;
   obtaining a corresponding target composition area according to the composition target information; and
   obtaining the initial image data in the target composition area so as to obtain target image data,
   wherein obtaining the composition target information in the initial image data captured by a lens, comprises:
   analyzing the initial image data captured by the lens, and obtaining first composition target in initial composition area;
   calculating the position information of the first composition target in the initial image data, and obtaining first composition target information;
   judging whether the first composition target information in the initial composition area is consistent with preset composition target information;
   obtaining second composition target in the initial image data according to the preset composition target information, if the first composition target information in the initial composition area is not consistent with the preset composition target information; and
   calculating position information of the second composition target in the initial image data, and obtaining second composition target information.

2. The method according to claim 1, wherein obtaining the corresponding target composition area according to the composition target information, comprises:
   calculating displacement difference between the first composition target information and the second composition target information; and moving the initial composition area according to the calculated displacement difference, so as to obtain the target composition area.

3. The method according to claim 2, wherein the preset composition target information includes central point information of person composition, central point information of scene composition, golden section point information of composition, or preset composition ratio information.

4. The method according to claim 1, wherein before obtaining the composition target information in the initial image data captured by the lens, comprises:
receiving a composition request set by users, and obtaining the preset composition target information.

5. The method according to claim 4, wherein the preset composition target information includes central point information of person composition, central point information of scene composition, golden section point information of composition, or preset composition ratio information.

6. The method according to claim 1, wherein the preset composition target information includes central point information of person composition, central point information of scene composition, golden section point information of composition, or preset composition ratio information.

7. A terminal comprising:
a storage unit storing a plurality of computer-readable program codes; and
a processor electrically connected to the storage unit and configured to execute the plurality of computer-readable program codes to:
obtain composition target information in initial image data captured by a lens;
obtain a corresponding target composition area according to the composition target information; and
obtain the initial image data in the target composition area so as to obtain target image data,
wherein the processor being configured to execute the plurality of computer-readable program codes to obtain the composition target information in the initial image data captured by the lens, comprises:
analyzing the initial image data captured by the lens, and obtaining first composition target in initial composition area;
calculating the position information of the first composition target in the initial image data, and obtaining first composition target information;
judging whether the first composition target information in the initial composition area is consistent with preset composition target information;
obtaining second composition target in the initial image data according to the preset composition target information, if the first composition target information in the initial composition area is not consistent with the preset composition target information; and
calculating position information of the second composition target in the initial image data, and obtaining second composition target information.

8. The terminal according to claim 7, wherein the processor being configured to execute the plurality of computer-readable program codes to obtain the corresponding target composition area according to the composition target information, comprises:
calculating displacement difference between the first composition target information and the second composition target information; and
moving the initial composition area according to the calculated displacement difference, so as to obtain the target composition area.

9. The terminal according to claim 8, wherein the preset composition target information includes central point information of person composition, central point information of scene composition, golden section point information of composition, or preset composition ratio information.

10. The terminal according to claim 7, wherein before obtaining the composition target information in the initial image data captured by the lens, the processor is configured to execute the plurality of computer-readable program codes to receive a composition request set by users, and obtain the preset composition target information.

11. The terminal according to claim 10, wherein the preset composition target information includes central point information of person composition, central point information of scene composition, golden section point information of composition, or preset composition ratio information.

12. The terminal according to claim 7, wherein the preset composition target information includes central point information of person composition, central point information of scene composition, golden section point information of composition, or preset composition ratio information.

* * * * *